United States Patent

[11] 3,565,116

| [72] | Inventor | Harold Gabin<br>Lansing, Mich. |
|---|---|---|
| [21] | Appl. No. | 759,384 |
| [22] | Filed | Sept. 12, 1968 |
| [45] | Patented | Feb. 23, 1971 |
| [73] | Assignee | White Motor Corporation<br>Cleveland, Ohio |

[54] SAFETY HOSE AND FITTING ASSEMBLY
8 Claims, 6 Drawing Figs.

[52] U.S. Cl. .................................................. 138/109
[51] Int. Cl. .................................................. F16l 11/04
[50] Field of Search .......................................... 138/109,
96, 122; 285/174; 264/342

[56] References Cited
UNITED STATES PATENTS

| 1,310,134 | 7/1919 | Poston | 285/174X |
|---|---|---|---|
| 2,430,921 | 11/1947 | Edelmann | 285/174X |
| 2,626,167 | 1/1953 | Lake | 285/174 |
| 2,700,988 | 2/1955 | Smisko | 138/109 |
| 3,093,448 | 6/1963 | Kirkpatrick et al. | 264/342X |
| 3,276,929 | 10/1966 | Ferch | 264/342X |
| 3,185,182 | 5/1965 | Waddell et al. | 138/122 |
| 3,198,059 | 8/1965 | Phaneuf et al. | 264/342 |

*Primary Examiner*—Louis K. Rimrodt
*Attorney*—Watts, Hoffman, Fisher & Heinke

ABSTRACT: The disclosure has a hose assembly including a flexible hose, an end fitting assembly and a protective sleeve of heat-shrinkable plastic placed around a portion of the hose and end fitting at the joint to deter removal of the fitting from the hose, reinforce the hose adjacent the coupling and other advantages.

PATENTED FEB23 1971          3,565,116

INVENTOR.
HAROLD GABIN
BY Watts, Hoffmann,
Fisher & Heinke
ATTORNEYS

SAFETY HOSE AND FITTING ASSEMBLY

FIELD OF THE INVENTION

Flexible hoses come with end fittings of either permanent or reusable types. The permanent types are either crimped or swaged onto end portions of hoses so as to remain more or less permanently affixed. Reusable fittings are in the form of an inner nipple and an outer socket in which a portion of the hose is firmly gripped between the nipple and socket in a manner to permit disassembly and removal of the fitting from the hose. Hydraulic systems employing fittings of both types are in wide usage.

The invention will be described with reference to a hose fitting of the removable type having an inner nipple and an outer socket. This description is not intended as a limitation of the invention which is applicable to any end fitting.

BACKGROUND OF THE INVENTION

1. Prior Art

When the hose becomes damaged or is weakened permanent fittings are discarded along with the hose. Unlike hoses provided with permanent fittings, reusable fittings may be disconnected from the end of the old hose and reused with a trimmed and shortened hose or with the new hose. There are advantages to both types. The permanent fittings come with a given length of hose designed to reach from one place to another in the system. The factory installation cannot readily be tampered with in the field by those who may wish to shorten the hose or readjust the fittings for one reason or another. Such inflexibility is frequently desirable as for safety reasons in systems where high temperatures and pressures exist. Power steering systems are examples of such systems. Thus for some applications permanent fittings may be prescribed by the manufacturer of the equipment, while for others it is quite suitable to obtain repair flexibility and reduce inventory requirements through the use of reusable fittings.

Another difficulty with prior art hose and fitting assemblies, whether of the reusable or permanent type, is the inherent weakening effect installation of the fitting has on the hose. A major cause of hose failures results from stretching the end of the hose, as is done to receive the nipple of a reusable fitting, or in crushing the wall of the hose in crimping on the ferrule of a permanent fitting. In either case the hose wall in the vicinity of the joint is weakened and the area immediately behind the end fitting is most likely to fail in service.

In motor vehicle applications it has always been desirable to improve corrosion resistance to salt spray. Salt induced corrosion is one of the major causes of hose assembly failures in vehicle power steering systems and the like. If the area behind the fitting is exposed to road splash, the possibility of early failure in this vulnerable area is further increased.

2. Need Served by the Invention

These and other difficulties are overcome by the present invention which contemplates hose and fitting assemblies provided with a protective plastic sleeve which is heat shrunk around portions of a hose and a connected fitting.

SUMMARY OF THE INVENTION

According to the invention, an assembly is provided including a hose, a fitting on one end portion of the hose and a protective sleeve surrounding a portion of the hose adjacent the fitting and extending longitudinally over a portion of the fitting. The sleeve is made of a plastic material having the property of elastic memory. The sleeve is heat shrunk to an internal diameter relative to the outer diameter of the hose such as to cause the sleeve to place the hose in compression and to conform the sleeve to the contour of the outer surface of the fitting.

The invention provides that the protective sleeve is made of a dimensionally unstable heat shrinkable polymeric material having a "memory" diameter which is less than the outer diameter of the hose. Biaxially oriented polyethylene is an example of such a plastic. It is not necessary to assemble the sleeve on the hose prior to installing the fitting. The sleeve can be slipped over the preassembled hose and fitting and heat shrunk thereon as a final operation.

It is also contemplated by the invention that an adhesive may be applied to the inner surface of the sleeve prior to assembly on the hose. The adhesive is preferably a heat setting type and forms a bond between the hose and sleeve during the heat shrinking operation.

Among the advantages of the invention in addition to those already mentioned such as the hose reinforcement and protection from corrosion are:

1. Leaks are quickly and easily detected. Since such a plastic sleeve is partially transparent fluid seeping through a small leak will be retained beneath the sleeve providing a visual indicator of an improper connection or a defective hose or coupling;
2. The sleeve provides an assist for quality control in that tampering or improper wrench application on a covered portion of the fitting which is not designed to be a wrench point for installation will mar or mark the sleeve leaving a telltale indication of tampering or improper installation technique;
3. It is also feasible to use the plastic sleeve as a hose identification tag by stamping or embossing it with the hose and fitting identifying number thus eliminating the use of metal tags and adhesive decals for this purpose which are often lost or accidentally removed;
4. The sleeve when applied to a reusable coupling provides the advantages of a permanent coupling while permitting the removal of the sleeve to retain the benefits of the reusable coupling; and
5. The plastic sleeve may be coated on the inside surface with a heat setting adhesive. When heat shrunk in place, the adhesive will form a bond between the sleeve and the hose. In effect this becomes a seal.

Accordingly the principal objects of the invention are a novel and improved hose and fitting assembly and a method of making such an assembly.

These and other objects and advantages of the invention will become more apparent by referring to the following description intended to be read with the accompanying drawings.

DESCRIPTION OF THE PREFERRED EMBODIMENT

Figure 3:
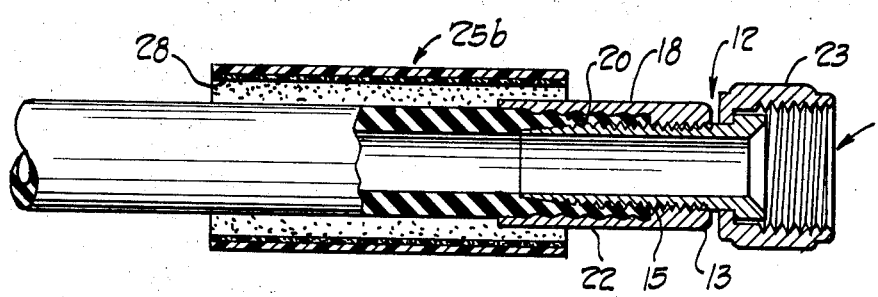
FIG. 3 is a longitudinal, sectional view of the sleeve, hose and end fitting depicting the sleeve being assembled with the hose and end fitting.
Figure 4:
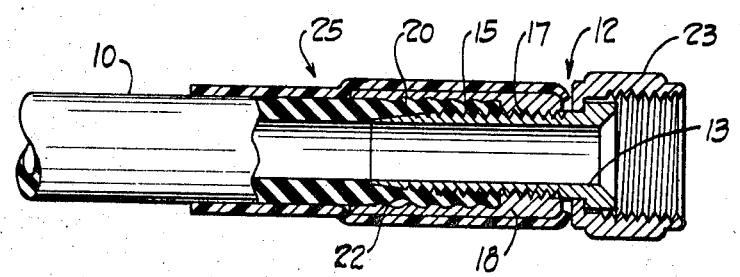
FIG. 4 is a longitudinal, sectional view of the sleeve, hose and end fitting after the sleeve has been heat shrunk to tightly grip the hose and a portion of the end fitting.

Referring now to the drawings, in FIGS. 3 and 4 a flexible hose 10 is shown provided with an end fitting indicated generally at 12. The hose is attached to the fitting 12 in a known manner which forms no part of the present invention. Briefly, a nipple 13 has a threaded exterior 15 engaging an internally threaded portion 17 of a socket 18, which together with the nipple 13, defines an annular chamber 20 adapted to receive the end of the hose 10. The socket 18 has threads 22 which cooperate with the extended threaded portion of the nipple 13 to grip the hose and prevent the leakage of fluid.

The hose and end fitting may be connected in the fluid line by the threaded coupling 23 retained on the end of the nipple 13.

In accordance with the invention, a protective plastic sleeve 25 surrounds a portion of the hose 10 and extends longitudinally over the major portion of the socket 18, thus substantially encasing the fitting with exception of the threaded coupling 23. As will be described more fully hereinafter, the portion of the hose 10 immediately adjacent the fitting 12 is tightly gripped by the sleeve 25, the rest of which is stretched around the socket 18 so as to conform to its outer surface.

The nipple and socket type of reusable fitting 12 illustrates only one type of removable or reusable fitting. It is not intended that the invention be limited to this particular type of fitting. Obviously, any type of fitting having parts which will permit assembly and disassembly of the fitting onto the end of a hose can be protected against removal by the application of sleeve 25. Moreover, even the permanent type of fitting which is crimped or swaged onto the end of the hose will be rendered more tamper-proof as well as having the other advantages previously discussed through application of the sleeve 25 to its exterior.

Figure 1:
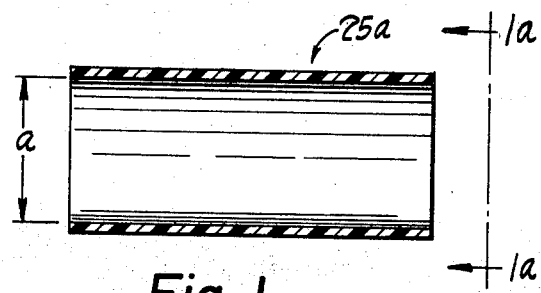
FIGS. 1 and 1a are views of an extruded plastic sleeve showing it at its initial diameter as extruded, Figure 1 being a longitudinal sectional view of the sleeve and FIG. 1a being an end view as seen from the plane indicated by the line 1a–1a of FIG. 1.
Figure 1A:
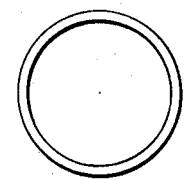
Figure 2:
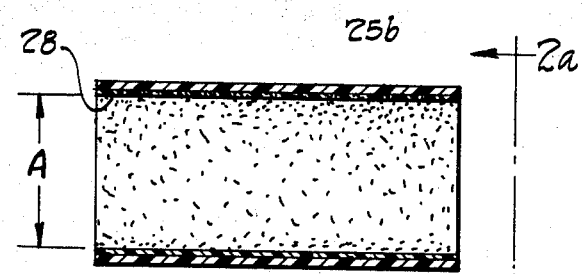
FIGS. 2 and 2a are views similar to FIGS. 1 and 1a depicting the sleeve in the cured or heat set state after being expanded from its extruded diameter to a diameter sufficiently large to allow insertion of the hose and end fitting, an adhesive coating being shown applied to the inner surface of the cured sleeve.
Figure 2A:
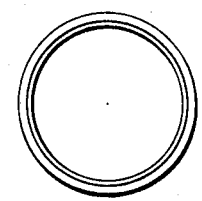

In FIGS. 1, 1a, the sleeve is identified as 25a. There it is shown in its extruded or molded condition of its primary stage of manufacture. It has a nominal inside diameter a. In FIGS. 2, 2a, the sleeve 25, identified by numeral 25b, is shown in a cured or heat set stage of manufacture in which the inside diameter A is expanded to a diameter greater than its extruded or molded dimension. This is part of the normal manufacturing process of the sleeve. The sleeve 25 is made of a material capable of an elastic or plastic memory, such terms being used interchangeably, the "memory" diameter condition being depicted in FIG. 4. A sleeve made from such a plastic when expanded under heat and pressure by use of a heated mandrel or the like and then cooled will hold its expanded position (FIGS. 2, 2a, 3) until reheated to a recovery temperature characteristic of the particular plastic whereupon it will recover to its "memory" diameter (FIG. 4). Various polymeric materials exhibit the property of elastic or plastic memory such as disclosed in U.S. Pat. No. 2,027,962.

In accordance with the invention, the nominal diameter $a$ of the sleeve 25a is less than both the outer diameter of the hose 10 and the outer nominal diameter of the socket 18.

In FIGS. 2, 2a, the sleeve 25b is shown after its normal manufacturing process in which it has been heated and expanded and then cooled to retain the enlarged or expanded condition in which the diameter A is larger than both the outer diameter of the hose 10 and the nominal diameter of the socket 18, that is the minimum diameter of the sleeve will be greater than the maximum girth of the socket 18.

An adhesive 28 may be applied to all or any part of the interior surface of the sleeve 25b. When the sleeve is heat shrunk onto the hose and fitting the adhesive forms a bond or seal between the hose, fitting and sleeve. Any adhesive material may be used but preferably one which is heat setting at the temperature which the sleeve is shrunk.

In FIG. 3, the sleeve 25b is shown being placed over the hose and fitting assembly. The sleeve is positioned such that when shrunk, it will envelope the portion of both the hose and the socket as shown in FIG. 4.

The polymeric materials available have a wide range of usable recovery temperatures thus permitting the utilization of a sleeve material having a temperature low enough so as not to damage the hose 10.

Referring to FIG. 4, upon reheating, the sleeve 25b contracts around the hose 10 and socket 18. The "memory" diameter will be less than the outer diameter of the hose 10 thus tending to stretch the sleeve placing the hose in compression. Preferably, the hoop stress in the sleeve will not exceed the elastic limit of the polymer. Obviously, the "memory" diameter will be less than the nominal diameter of the socket 18, so that it will shrink onto the hexagonal outer surface of the socket 18 to more or less conform to its shape as shown in FIG. 4.

The sleeve may extend farther along the hose if desirable, although it is not necessary that it extend much more than an inch beyond the end of the fitting to accomplish the major objectives of the invention. Nor is it necessary to completely encase the socket 18 of the fitting although this is usually desirable.

If desired, the sleeve may be preformed or contoured when cured to more closely fit the parts to which it is assembled. For example, the sleeve 25b may be expanded on a mandrel having different diameters, one approximately the nominal diameter of the socket 18 and another the diameter of the hose. Thus the cured sleeve would have two internal diameters, each closely approximating those of the parts it will encase.

Among the advantages of the sleeve 25 is to render the fitting and hose assembly substantially tamper proof. Thus, it is possible for certain classes of hose to be equipped with reusable fittings where heretofore permanent fittings were specified for safety reasons. However, this is not to say that the invention is not equally applicable to permanent fittings for corrosion resistance, as an indicator of improper installation technique or leakage indication.

Modifications of the invention will be apparent to those skilled in the art to which it pertains which modifications are to be regarded as reasonable equivalents thereof and are intended to be covered by the appended claims except insofar as limited by the prior art.

I claim:

1. A flexible elastomeric hose and rigid end fitting joined together to form a fluid-tight connection comprising, in combination, a plastic sleeve surrounding a portion of the hose and extending longitudinally over a portion of the fitting protectively encasing the end fitting portion and elastically resisting expansion of said hose portion from its initial outer diameter when subjected to a fluid pressure from within, said plastic sleeve having an elastic recovery diameter less than the outer diameter of the hose when subjected to a predetermined temperature and being initially in a dilated state sufficiently large to freely encircle said hose and end fitted portions and thereafter being heat shrunk while circumjacent thereto causing the sleeve to assume a lesser diameter in relationship to said portions thereby elastically deforming the plastic sleeve over said portions and tending to place said elastomeric hose portion in a state of resilient compression in opposition to the fluid pressure acting therein for a substantial distance axially of said fluid-tight connection whereby said elastically constricting plastic sleeve renders said hose and end fitting portions more secure without inhibiting the relative flexibility of the connection.

2. A flexible hose and end fitting according to claim 1 wherein the plastic sleeve is a polymeric material having a tendency to return to its elastic recovery diameter upon heating to a temperature below that which would damage the hose.

3. A flexible hose and end fitting according to claim 2 wherein the plastic sleeve has a circumferential elasticity sufficiently high so as to slightly compress the hose.

4. A flexible hose and end fitting according to claim 3 wherein the plastic sleeve is partially transparent.

5. A flexible hose and end fitting according to claim 1 in which the plastic sleeve is made of a polyethylene material having heat shrinkable properties in at least the radial direction.

6. A tube and fitting assembly comprising:
   a. an elongated tubular section having walls defining longitudinally extending fluid passage, said tubular section having an end portion;
   b. a fitting section having a portion in telescopic relationship with said tubular section end portion and providing means to connect the assembly to a coacting fitting or the like;
   c. said portions being cooperatively interconnected to form a fluid-tight connection with at least one of said portions being in a circumferentially stressed condition to participate in the maintenance of said fluid-tight connection; and d. a tubular plastic sleeve around a part of said fitting section and stressed therearound, the sleeve and fitting being in tight, circumferential, interfitting, relationship with the sleeve being contoured in at least one plane of cross section to the peripheral configuration of said fitting section in such plane and being elastically constricted about the end portion of said tubular section tending to place it in resilient compression, said sleeve having an elastic recovery diameter less than the outer diameter of the tubular section and being initially dilated to have an inner diameter sufficiently large to permit assembly on the circumjacent tubular section end and fitting section portions whereby the fluid-tight connection between said portions is made more secure without inhibiting the relative flexibility thereof.

7. The assembly of claim 6 wherein said sleeve extends over a part of said tubular section adjacent said fitting section and is in tight, circumferential, interfitting relationship with said tubular section for a substantial distance axially along said tubular section in the direction away from said fitting section.

8. The assembly of claim 6 wherein an inner surface of the sleeve is coated with an adhesive and an adhesive bond is formed between the sleeve and tubular section.